(12) United States Patent
Hiemer (10) Patent No.: US 9,718,089 B2
(45) Date of Patent: Aug. 1, 2017

(54) INTERMEDIATE PIECE FOR THE CONNECTION OF A DISPENSING ELEMENT TO A STORAGE CONTAINER

(71) Applicant: SULZER MIXPAC AG, Haag (CH)

(72) Inventor: Andreas Hiemer, Rebstein (CH)

(73) Assignee: SULZER MIXPAC AG, Haag (CH)

( * ) Notice: Subject to any disclaimer, the term of this patent is extended or adjusted under 35 U.S.C. 154(b) by 10 days.

(21) Appl. No.: 14/777,562

(22) PCT Filed: Mar. 13, 2014

(86) PCT No.: PCT/EP2014/054963
§ 371 (c)(1),
(2) Date: Sep. 16, 2015

(87) PCT Pub. No.: WO2014/146967
PCT Pub. Date: Sep. 25, 2014

(65) Prior Publication Data
US 2016/0288158 A1    Oct. 6, 2016

(30) Foreign Application Priority Data
Mar. 20, 2013   (EP) .................................... 13160184

(51) Int. Cl.
*B05C 17/005* (2006.01)
*B05C 11/10* (2006.01)
*F16K 15/04* (2006.01)

(52) U.S. Cl.
CPC .... *B05C 17/00553* (2013.01); *B05C 11/1028* (2013.01); *F16K 15/044* (2013.01)

(58) Field of Classification Search
CPC ........... B05C 17/00553; B05C 11/1028; F16K 15/044
USPC .............................................. 222/145.1, 145.6
See application file for complete search history.

(56) References Cited

U.S. PATENT DOCUMENTS

| | | | | |
|---|---|---|---|---|
| 3,359,995 A | * | 12/1967 | Parisi | ...................... F16K 11/10 137/102 |
| 3,837,575 A | * | 9/1974 | Lehnert | ................. B05B 7/1209 239/112 |
| 4,117,551 A | | 9/1978 | Brooks | |
| 4,261,481 A | * | 4/1981 | Speer | .................... B01F 5/0645 222/135 |
| 2005/0035153 A1 | * | 2/2005 | Brown | .................. B01F 5/0682 222/145.6 |

(Continued)

FOREIGN PATENT DOCUMENTS

DE    8715069 U1    1/1988
EP    0607102 A1    7/1994
(Continued)

*Primary Examiner* — Donnell Long
(74) *Attorney, Agent, or Firm* — Global IP Counselors, LLP (57) ABSTRACT

An intermediate piece includes an upper element and a lower element, and a check valve including a head and a spring element exerting an opening pressure on the head. The check valve is arranged between the upper element and the lower element at the first or second passage and is configured such that a first or second passage can be closed by the check valve and such ay that the first or second passage is opened when a dispensing pressure counteracting the opening pressure is applied at least at the respective flowable component.

14 Claims, 6 Drawing Sheets

(56) References Cited

U.S. PATENT DOCUMENTS

2006/0114745 A1    6/2006    Ollmann et al.
2010/0200614 A1    8/2010    Von Rotz et al.

FOREIGN PATENT DOCUMENTS

EP    1652589 A2    5/2006
EP    1806184 A2    7/2007
EP    2221114 A2    8/2010

* cited by examiner

INTERMEDIATE PIECE FOR THE CONNECTION OF A DISPENSING ELEMENT TO A STORAGE CONTAINER

CROSS-REFERENCE TO RELATED APPLICATIONS

This application is a U.S. National stage application of International Application No. PCT/EP2014/054963, filed Mar. 13, 2014, which claims priority to EP Application No. 13160184.1 filed Mar. 20, 2013, the contents of each of which is hereby incorporated herein by reference.

BACKGROUND

Field of Invention

The invention relates to an intermediate piece for the connection of a dispensing element to a storage container for a separate storage of at least two flowable components.

Background Information

From the EP 2 221 114 A1 an intermediate piece for the connection of a dispensing element to a storage container is known. The intermediate piece in this connection comprises a first and a second passage each having an inlet opening at the first passage and at the second passage. In accordance with this solution one of the two inlet openings includes an element such that one of the inlet openings can be aligned by the element in a matching position with respect to the storage container. The element can only be positioned in a single position relative to the associated recess which has the consequence that the intermediate piece can only be mounted in a single position at the storage container. Due to this arrangement a contamination or a mixing of the flowable components can be avoided on the connection of the intermediate piece and/or of the dispensing element to the storage container.

The intermediate piece described in the EP 2 221 114 A1 avoids a contamination of the flowable components prior to the connection of the storage container and the dispensing element in accordance with their use. However, following the connection an uncontrolled re-flux from the dispensing element into the intermediate piece or even into the storage container can be brought about. In this connection, in the worst case, a complete dispensing apparatus can become inoperative when the first and second components mix in the storage container or even if these cure there.

SUMMARY

For this reason it is the object of the invention to provide an intermediate piece with enables a mixing and a contamination of the flowable components to be avoided.

In accordance with the invention this object is satisfied by an intermediate piece having the features of the claim 1.

The dependent claims relate to particularly advantageous embodiments of the invention.

The invention relates to an intermediate piece for the connection of a dispensing element to a storage container for a separate storage of at least two flowable components. The intermediate piece in, this connection has a first passage for conveying a first component from the storage container to the dispensing element and it has a second passage for conveying a second component from the storage container to the dispensing element, wherein the first passage and the second passage are configured separate from one another such that the first component and the second component can be guided separately by the intermediate piece. In accordance with the invention a check valve is arranged at the first or the second passage and is configured in such a way that the first or second passage can be closed by the check valve.

The object is satisfied in such a way that the check valve is arranged at, preferably in, a first inlet opening of the first passage or a second inlet opening of the second passage of the intermediate piece and is particularly preferably arranged in a region of a first outlet opening of the first passage or a second outlet opening of the second passage of the intermediate piece. Moreover, the check valve closes the first or the second passage as soon as a material flow of the flowable components is interrupted. In this connection the check valve can either be arranged in the first or the second passage of the intermediate piece, a respective check valve can, however, also be arranged in the first and in the second passage.

The check valve includes a head, a spring element, as well as a first or second valve seat. The spring element exerts an opening pressure on the head and presses the head into the first or the second valve seat such that the first or the second passage can be closed in a fluid tight manner. A fluid tight manner is to be understood such that the flowable components can no longer flow further through the first or the second passage. If a dispensing pressure counteracts the opening pressure at the flowable components in the storage container, then the head is pressed out of the first or the second valve seat and the check valve is opened. If no dispensing pressure is present then no pressure or merely the opening pressure of the spring element acts on the head and the head closes the first or the second valve seat, in particular closes an opening in the first or the second valve seat, alternatively in the first or the second passage.

The check valve can, in dependence on the used flowable components, have a pre-determined opening pressure, for example, of 0.01 to 0.7 bar, in particular 0.1 to 0.55 bar. Thus, the opening pressure of the check valve to be overcome is small having regard to the relatively high required dispensing pressure. The opening pressure is, however, sufficient in order to bring about a closure of the first or second passage and to generate a desired reaction towards the storage container, so that even low-viscosity flowable components can be retained at a low flow resistance.

Advantageously it is thereby achieved that the check valve closes the first or the second passage and interrupts a flow of the flowable components as soon as a dispensing pressure respectively present on dispensing reduces. Thus, the check valve prevents a reflux of already dispensed flowable components from the dispensing element into the intermediate piece and/or from the storage container into the intermediate piece and a contamination and/or a mixing of the components due to the reflux. As an advantageous side effect the check valve has a closure function and stops the material flow. Additionally, the check valve also prevents uncontrolled leakage currents when no dispensing pressure is present and indeed both in the intermediate piece and also in the dispensing element such that a local inhomogeneity of the already dispensed flowable components, in particular for a different viscosity of the components is prevented.

In this connection the intermediate piece has a first passage for conveying a first component from the storage container to the dispensing element and has a second passage for conveying a second component from the storage container to the dispensing element, with the first passage and the second passage being configured separate from one another. Naturally also more than two passages can be provided. Furthermore, a first inlet opening is provided which opens into the first passage, a second inlet opening which opens into the second passage is also provided.

The first passage terminates in a first outlet opening and the second passage terminates in a second outlet opening which is attached at an end face of the intermediate piece and spans an outlet plane. The outlet plane, for example, lies parallel with respect to an inlet plane which is spanned by the first inlet opening and the second inlet opening. However, it is, for example, also possible that the outlet plane and the inlet plane form an angle and do not lie parallel. The flowable components arrive at the dispensing element from the dispensing opening. The end face can be planar; however, can also have a guide element which projects from the end face for deflecting material flows.

The intermediate piece is provided for the connection of a dispensing element to a storage container for a separate storage of at least two flowable components. The intermediate piece in this shape can be decoupled both from the dispensing element and also from the storage container and can be present as a single component. Likewise the intermediate piece can, however, also form a common component, for example with the dispensing element or the storage container. This means that the intermediate piece can, for example, either be produced with an own tool, preferably in an injection molded process or can, however, also be produced as a part of the dispensing element or of the storage container, preferably in an injection molded process.

The dispensing element comprises a housing and a mixing element, wherein the housing has an inlet region. The dispensing element can, for example, be a mixer, in particular a static mixer and can be suitable for a mixing of flowable components. The mixing element can, for example, in turn have one or more solid or flow-influencing deflection elements, such that a mixing of the flowable components can be brought about by the flow movements. The mixing element can alternatively separate and combine the material flow, whereby the mixing is achieved.

The housing can have a cross-section which is circular such that the housing has a generally hollow cylindrical basic shape which, for example, conically tapers in a direction of an end of the housing. The cross-section of the housing can, however, also have a different shape, such as for example, oval, rectangular and quadratic.

A fluid to be mixed generally includes two different flowable components to be mixed. However, also more than two flowable components can form a fluid to be mixed. In the most cases the flowable components are present in a liquid state or as a pasting mass. This includes, for example, pastes, adhesives but also flowable components which are used in the medical field, which preferably include pharmaceutical agents, or, however, flowable components, for example, for cosmetic applications or applications in the food industry. For example, easily mixable and also mixtures difficult to be mixed or lightly viscous or highly viscous components can be processed. In particular such dispensing elements are also used as single use mixers for mixing a fluid of flowable components to be hardened, such as, for example, a mixture of multicomponent adhesives or sealing masses. A different preferred application lies in the mixing of mold masses in the dental field.

The dispensing element can be attached at the storage container, in particular at a dispensing device, for example a dispensing cartridge or a multicomponent cartridge, by the intermediate piece. The storage container can include a plurality of, in particular cylindrical, chambers, wherein double cartridges with two chambers are preferred. The chambers, this means the inner space of the cartridges, can be of circular cylindrical shape or have an elliptical or polygonal cross-section. In the filled state the chambers each include at least a fillable component with a filling mass. This filling mass can be separated from the environment, for example, by a piston freely displaceable in the chamber. The piston, for example, includes sealing elements which terminate the chamber contents in a fluid sealing manner from the environment. The components in the chambers are dispensed with aid of a dispensing plunger which cooperates with the corresponding piston in such a way that the piston can be displaced in the chamber.

The storage container also includes a molded part serving as an outlet region besides the cylindrical chambers. In this connection the outlet region, for example, relates to a totality of tubular molded parts of the individual chambers and/or, for example, a cylindrical connection part. The outlet region can be gripped over by a rotary cap and have a dispensing opening for each component, this means the individual components are held separate from one another up to at least in front of the dispensing opening, such that a premature mixing of the components is prevented. The dispensing openings can thus be held closed in a fluid tight manner by the rotary caps in such a way that the components can be stored in the chambers of the multicomponent cartridges over longer periods of time and such that they can also be transported in the multicomponent cartridge.

The intermediate piece includes an upper element and a lower element, wherein the check valve is arranged between the upper and the lower element at the first or the second passage. Moreover, the upper element or the lower element may comprise a connection element and the upper element and the lower element may be connected to one another by the connection element.

The intermediate piece can thus be configured multipart, at least in two-part form. In this connection the upper element is aligned in the direction of the dispensing element and can be connected to the dispensing element. The lower element is aligned in the direction of the storage container and can be connected to the dispensing element. Moreover, the upper element or the lower element have a connection element, wherein, for example, an adhesive or also a pin and a pin hole or a slot respectively and possibly further a fastening means or device are to be understood as a connection element. Thus, advantageously the check valve can be initially mounted between the upper and the lower element and then the upper and the lower element can be connected to one another.

A part of the first passage and the second passage may be respectively formed in the upper and the lower element, wherein the portion of the first passage and the portion of the second passage are configured separate from one another such that the first component and the second component can be separately guided by the upper and lower element, this means that the flowable components do not mix. If the upper and the lower element are connected to one another then the part of the upper and of the lower element are configured as the first passage and the second passage. In this connection the upper and the lower element can be connected to one another in a fluid tight manner, this means such that none of the flowable components can exit in an uncontrolled manner. However, if required also a seal can be arranged between the upper and the lower element. In this connection the inlet openings of the intermediate piece are configured in the lower element and the outlet openings are configured in the upper element.

The check valve is arranged between the upper and the lower element, this means that, in particular in the first passage or in the second passage. Preferably the first valve seat or the second valve seat is arranged at the lower element and/or the spring element is arranged at the upper element. It is of advantage that the same intermediate piece can thus selectively be equipped with or without a check valve in dependence on the application. Also the opening pressure, this means a restoring force of the spring elements, can selectively be varied in dependence on the first component or on the second component. Moreover, the check valve can be manufactured and/or mounted better in this manner.

The check valve comprises a head and a spring element, wherein the head of the check valve is preferably configured as a sphere. The spring element has the function of holding the head at the required opening pressure in the first valve seat or in the second valve seat and to close this. In this connection the spring element can, for example, be configured as a spring, in particular as a coil spring, preferably as a wound torsional spring, also referred to as a spiral spring, but can also be configured as a torsional spring or as a flexible spring. The head, also referred to as a blocking body, can preferably be spherical, however, for example can also be configured plate-shaped, hose-shaped, piston-shaped or spherical. The head can, moreover, be connected to a shaft, for example, the sphere can be connected to a shaft, wherein the shaft and the head can be of one-part design or of multi-part design. Advantageously the head with the shaft can thus be adjusted in the spring element. A further advantage is that, depending on the embodiment, the technical properties of the check valve can be matched and varied with respect to the intermediate piece and to the flowable components due to a multi-part design.

In an embodiment of the invention a surrounding edge is configured as a first valve seat or as a second valve seat in the first passage or in the second passage such that the spring element exerts an opening pressure at the head, the head contacts at the first valve seat or at the second valve seat and closes the first passage or the second passage. The surrounding edge can be arranged between the inlet openings and the outlet openings of the intermediate piece in the first passage or in the second passage. In this connection the surrounding edge is configured in the first passage or in the second passage in such a way that the spring element exerts an opening pressure at the head and presses this into the first valve seat or into the second valve seat. Moreover, the valve seat has a cross-sectional shape which is matched to the cross-sectional shape of the head, for example, is ring-shaped or polygonal, such that the head closes the valve seat in a fluid tight manner in a pressure free state. Advantageously the first valve seat and the second valve seat can be configured as a part of the intermediate piece, whereby the check valve can be manufactured cheaper and can be mounted more efficiently.

As a particular measure the upper element includes a fixing element and the spring element is arranged at the fixing element and can be adjusted by the fixing element. The fixing element can be configured connected to the upper element in one piece or, however, be of two part or multipart design. The fixing element can, for example, be configured as a shaft or as a plug or, however, as a recess. The spring element can, for example, be plugged onto and/or plugged into the fixing element and can be adjusted simply at the fixing element. The fixing element can, however, also be configured such that the spring element is, for example, connected in the recess or even turned into and/or latched in the recess. The fixing element can align the spring element and/or the check valve in that it aligns the spring element in the direction of the first or the second passage. Also in this case the simple assembly of the check valve is of advantage.

The intermediate piece in accordance with the invention can also be a part of the dispensing element, wherein the dispensing element comprises a housing which at least includes one mixing element and the housing has an inlet region, with the intermediate piece being arranged in the inlet region. As already described the dispensing element has a housing and a mixing element, wherein the housing has an inlet region.

The dispensing element can, for example, be a mixer, in particular a static mixer, and can be suitable for the mixing of flowable components. Advantageously an inner contour of the intermediate piece is dimensioned, in particular in the region of the first outlet opening and of the second outlet opening of the upper element, such that this can contact at a region of the dispensing element in an aerial manner, in particular in the inlet region. Advantageously a secure guidance of the intermediate piece is ensured by this measure and leaks between the dispensing element and the intermediate piece are avoided. Since it is simple from a construction point of view and from the point of view of handling, it is preferred when the intermediate piece is connected to the dispensing element, in particular to the housing, without a treaded connection, for example by a snap on connection. The dispensing element and the intermediate piece can also be connected via a line, for example a tube or a hose, such that an inner contour of the intermediate piece is dimensioned such that it can aerially contact at a region of the line, in particular at an inlet region of the line. Thus, different dispensing elements can be advantageously connected to the same intermediate piece. It is also possible that the intermediate piece is molded at the dispensing element, such that the intermediate piece is configured in one piece with the dispensing element, in particular with the inlet region of the housing. For this purpose the intermediate piece and the dispensing element can be manufactured in a manufacturing step as a one-piece component, such that a one-piece dispensing element can be advantageously manufactured with an intermediate piece and a check valve. The intermediate piece or the dispensing element can, for example be manufactured of plastic, preferably in an injection molded process. In particular the plastic can comprise a foamed polymer, wherein with respect to a conventional injection molded process a polymer including an expanding agent can be used in this case for the manufacture.

The intermediate piece in accordance with the invention can, however, also be a part of a storage container having a separate storage for a plurality of components, wherein the storage container can have an outlet region and the intermediate piece can be arranged in the outlet region. The intermediate piece and the storage container can, however, also be of two-part design. This embodiment has the advantage that, for example, different intermediate pieces can be connected to the same storage container or, however, that different storage containers can be connected to the same intermediate piece.

The storage container includes at least a first chamber and a second chamber, in order to dispense a first and a second flowable component. However, it is also possible that the storage container has a third chamber and possibly a further chamber and thus three or more components can be dispensed and mixed. The storage container, for example, can be designed of plastic and can be produced by an injection molded process.

Preferably an inner contour of the intermediate piece, in particular in the region of the first and second inlet opening of the lower element, for example the inlet plane, is dimensioned such that this can aerially contact at a region of the storage container, in particular at the outlet region. Advantageously a secure guidance of the intermediate piece is ensured by this measure and leaks between the storage container and the intermediate piece can be avoided. Since it is particularly simple from a construction point of view and from the point of view of handling, it is preferred when the intermediate piece can be connected to the storage container without a threaded connection, for example, by a snap on connection.

The storage container and the intermediate piece can also be connected by a line, for example, a tube or a hose, wherein an inner contour of the intermediate piece is dimensioned such that this can aerially contact at a region of the line, in particular at an outlet region of the line. Thus, different storage containers can be advantageously coupled to the same intermediate piece.

The intermediate piece in accordance with the invention can, however, also be a part of a dispensing apparatus having a dispensing element or having a storage container. The dispensing apparatus can be a combination of the storage container with the intermediate piece and the dispensing element. As an example for such a dispensing apparatus, in particular a multicomponent cartridge can be named which is connected to the intermediate piece and the intermediate piece being connected to the dispensing element. The dispensing apparatus can have an actuation element. The actuation element can include a first and a second piston, wherein, for example the first piston is arranged in the first chamber and the second piston is arranged in the second chamber in a displaceable manner. By dis-placing the piston in the direction of the dispensing opening, this means in the dispensing direction, the first component and the second component can be pressed into the first inlet opening and into the second inlet opening of the intermediate piece and can exert a dispensing pressure at the check valve.

In this connection the displacement takes place, in particular by hand. The actuation element in this connection is partly arranged within the storage container, whereby a particularly compact assembly of the dispensing apparatus results.

Further advantageous, features and particulars of the invention result from the dependent claims, as well as with reference to the description of the embodiments and by the drawing.

BRIEF DESCRIPTION OF THE DRAWINGS

In the following the invention will be described both from an apparatus point of view and from a method procedural point of view by embodiments with reference to the drawing in detail. In the schematic drawing there is shown.

DETAILED DESCRIPTION OF THE EMBODIMENTS

Figure 1:
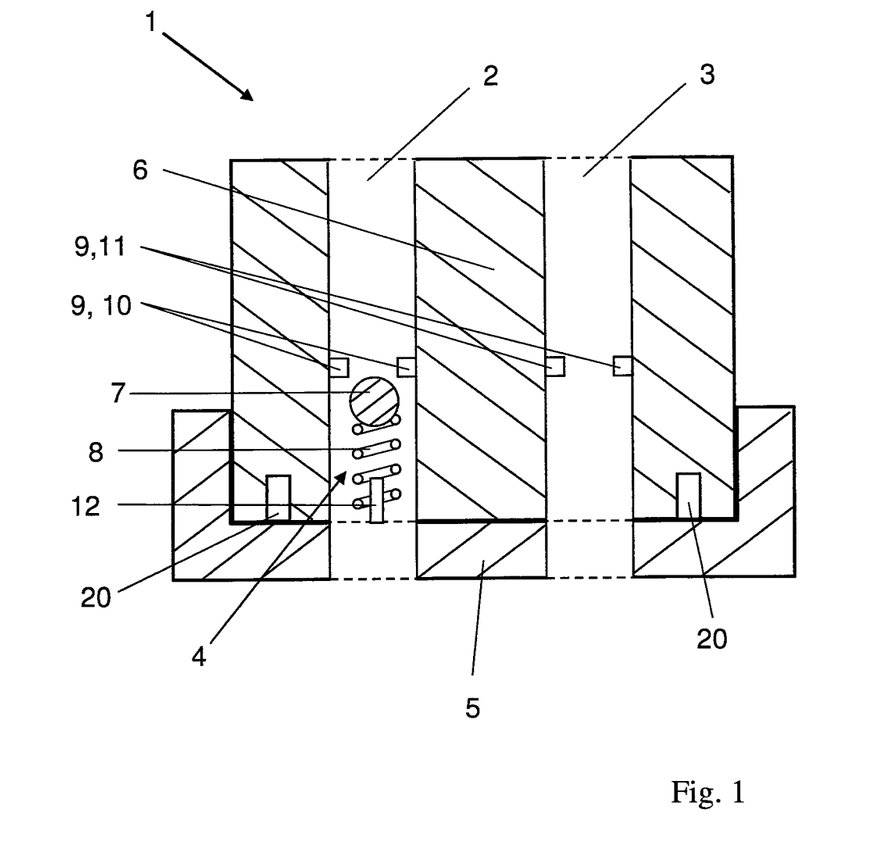
FIG. 1 is a section trough an intermediate piece in accordance with a first embodiment of the invention.

FIG. 1 shows a section through an intermediate piece 1 in accordance with a first embodiment of the invention. The intermediate piece 1 is of two-part design and includes an upper element 5 and a lower element 6. The intermediate piece 1 includes a first passage 2 for conveying a first component from a storage container 17 (see FIG. 3) to a dispensing element 13 (see FIG. 2) and has a second passage 3 for conveying a second component from the storage container 17 to the dispensing element 13. The first passage and the second passage 2, 3 in this connection lead through the upper and the lower element 5, 6. Moreover, the first passage 2 and the second passage 3 are designed separate from one another, in such a way that the first component and the second component can be guided separately by the intermediate piece 1. A check valve 4 is arranged between the upper and the lower element 5, 6 at the first passage 2. A surrounding edge 9 is formed as a first valve seat 10 and as a second valve seat 11 in the first passage and in the second passage 2, 3 in the lower element 6. The check valve 4 includes a head 7 and a spring element 8, wherein the spring element 8 exerts an opening pressure on the head 7 and the head 7 closes the valve seat 10. In the present embodiment the head 7 of the check valve 4 is configured as a sphere 7. The upper element 5 moreover includes a fixing element 12 by which the spring element 8 is arranged in the first passage 2 and by which the spring element 8 can be adjusted. So that the upper element 5 and the lower element can be connected to one another, the upper element 5 or the lower element 6 include a connection element 20.

Figure 2:
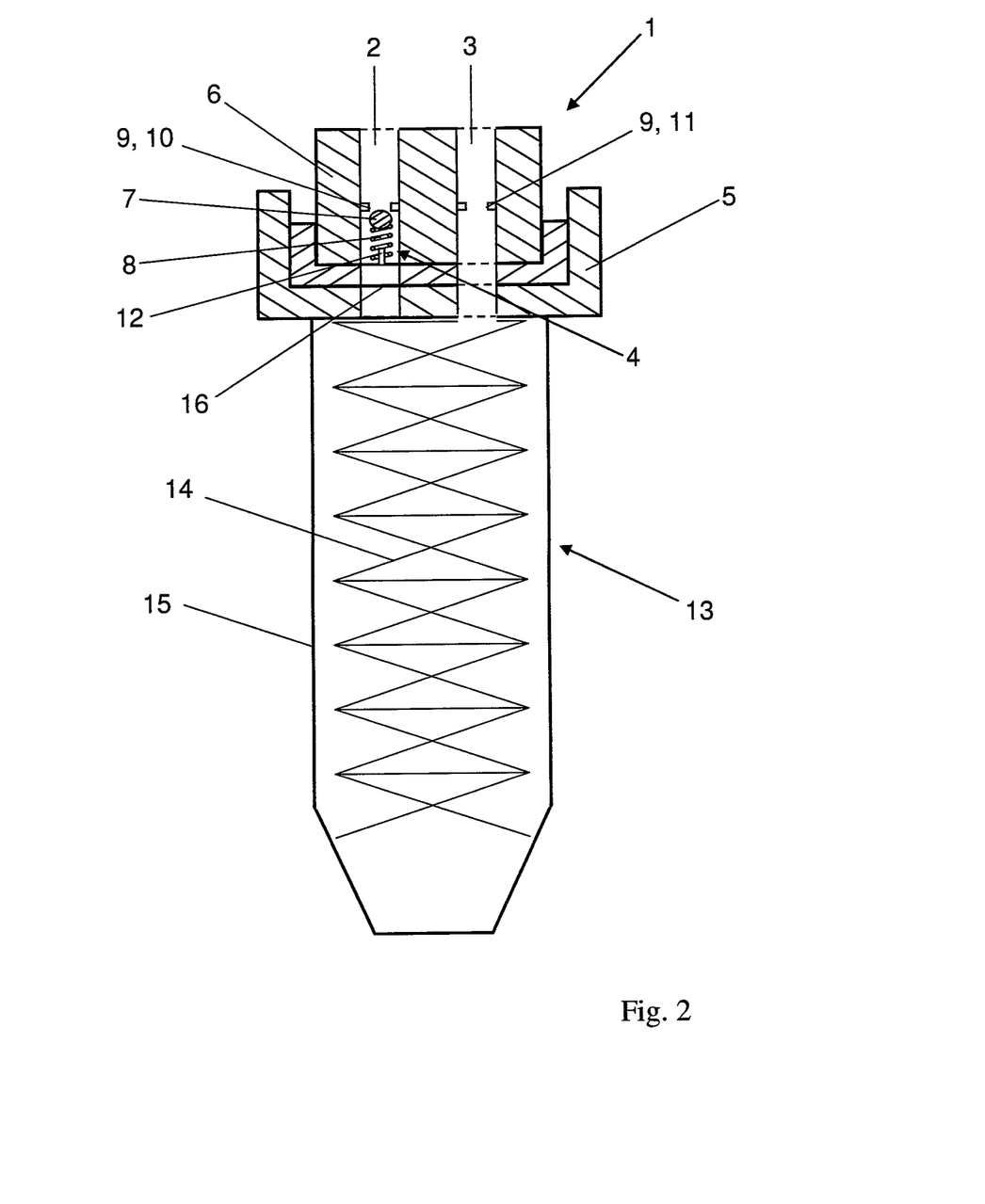
FIG. 2 is a section through a dispensing element having an intermediate piece in accordance with a second embodiment of the invention.

FIG. 2 shows a section through a dispensing element 13 having an intermediate piece 1 in accordance with a second embodiment of the invention. The dispensing element 13 includes a housing 15 which includes at least one mixing element 14 and an inlet region 16. The intermediate piece 1 in this connection is arranged in the inlet region 16. The dispensing element 13 and the intermediate piece 1 are of two-part design and the dispensing element 13 is connected to the intermediate piece 1, in particular to the upper element 5, in the inlet region 16, for example, screwed, latched or connected by a snap on connection. However, it is also possible that the dispensing element 13 and the intermediate piece 1 are manufactured as a one-part unit. A mixing element 14 is arranged in the housing 15 which mixer is configured as a spiral mixer having a helical structure. The mixing element 14 has the function of through mixing the individual components well, such that a substantially homogenous fluid arises.

Figure 3:
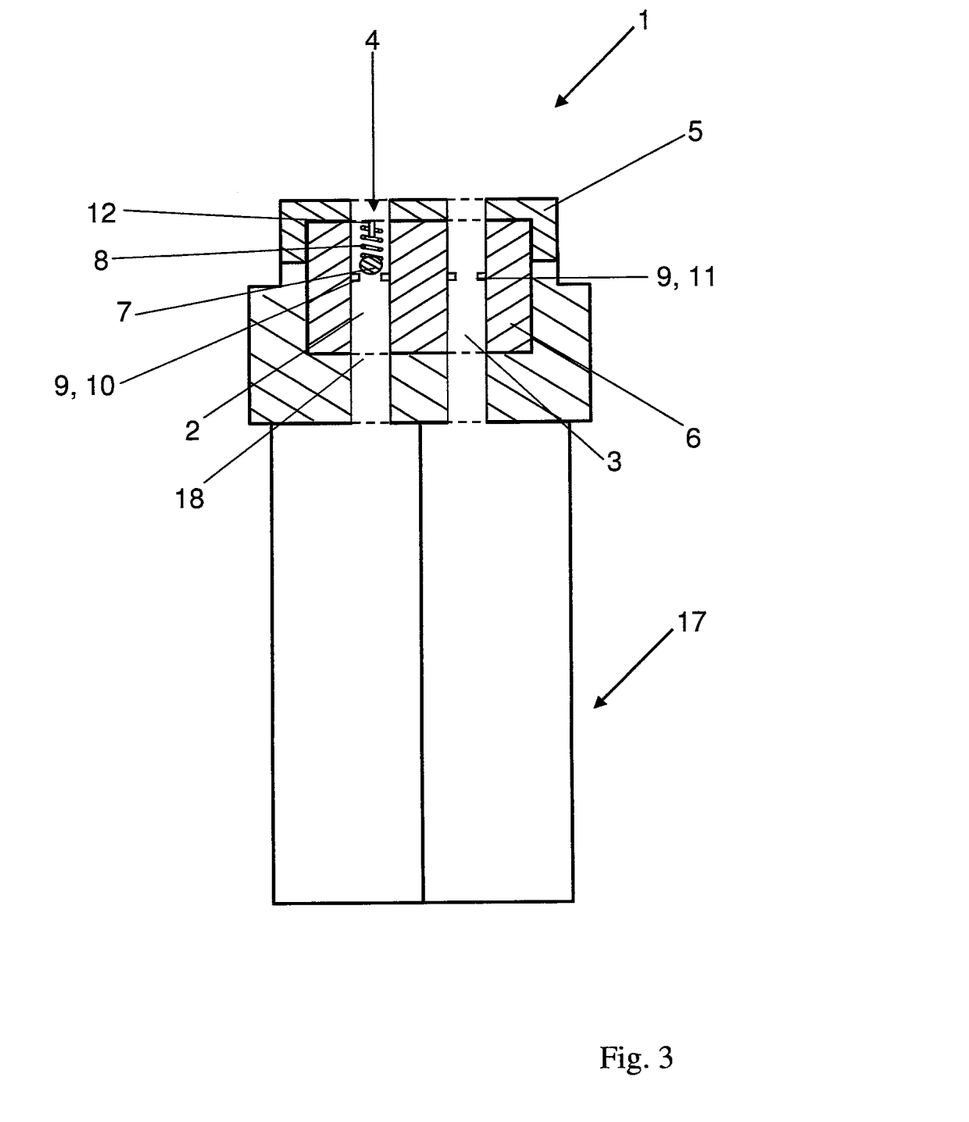
FIG. 3 is a section through a storage container having an intermediate piece in accordance with a third embodiment of the invention.

FIG. 3 shows a section through a storage container 17 having an intermediate piece 1 in accordance with a third embodiment of the invention. The storage con-tainer 17 has an outlet region 18 and the intermediate piece 1 is arranged in the outlet region 18. The storage container 17 and the intermediate piece 1 are of two-part design and the storage container 17 is connected to the intermediate piece 1, in particular to the lower element 6, in the outlet region 18, for example, by screwing, latching or by a snap on connection. However, it is also possible that the storage container 17 and the intermediate piece 1 are manufactured as a one-part unit.

Figure 4:
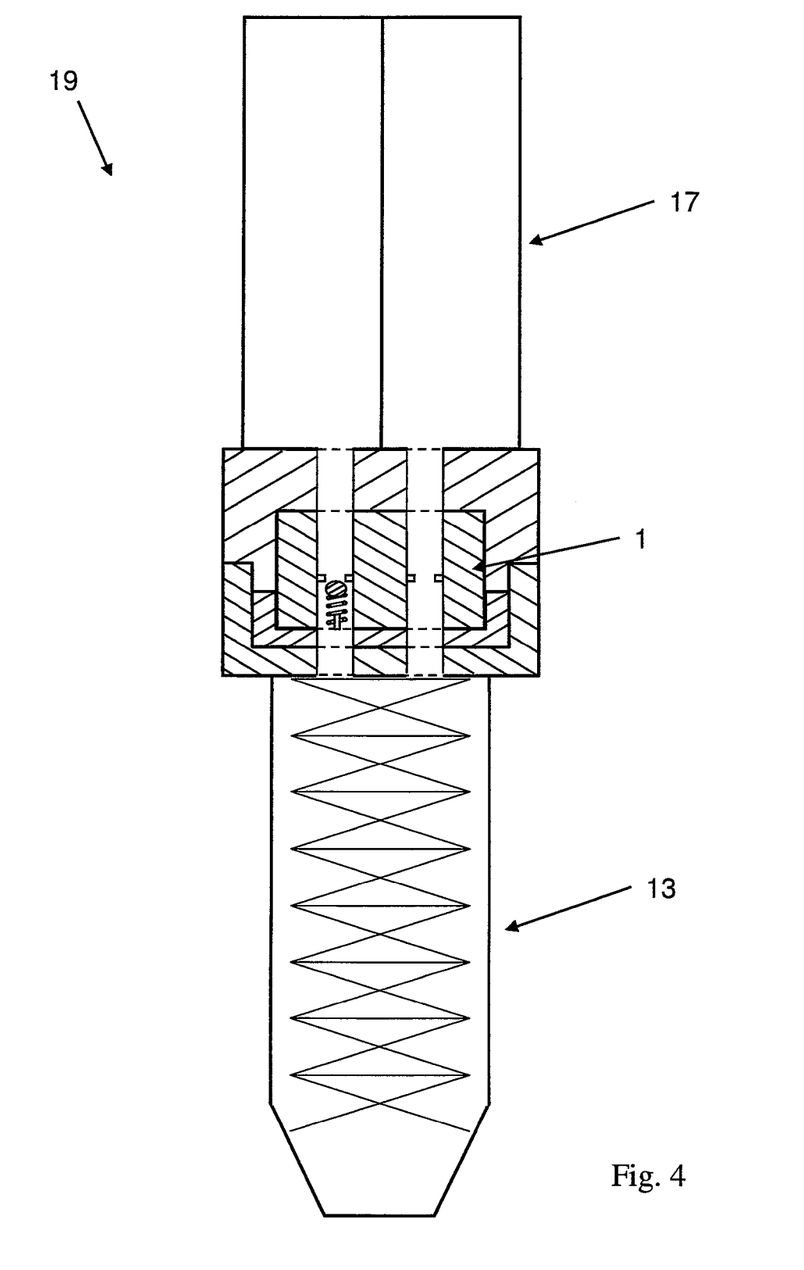
FIG. 4 is a section through a dispensing apparatus having an intermediate piece in accordance with fourth embodiment of the invention.

FIG. 4 schematically shows a section through a dispensing apparatus 19 having an intermediate piece 1 in accordance with a fourth embodiment of the invention. The dispensing apparatus 19 includes a storage container 17 in the shape of a cartridge for a first and a second flowable component, a dispensing element 13 and an intermediate piece 1. As already described the dispensing element 13 has a housing 13 which in turn includes a mixing element 14. Such mixing elements, such as are, for example shown in FIG. 4, are configured as a spiral mixer having a helical structure. The dispensing apparatus 19 has the function of conveying the at least two flowable components from the storage container 17 into the dispensing element via the intermediate piece and to through mix them well there, such that a substantially homogenous fluid arises. The storage container 17 of the dispensing apparatus 19 is connected to the dispensing element 13 by means of the intermediate piece 1. The intermediate piece 1 includes a first passage 2 and a second passage 3, wherein the first component is conveyed in the first passage 2 from the storage container 17 to the dispensing element 13 and the second component is conveyed in the second passage 3 from the storage container 17 to the dispensing element 13. Naturally also more than two passages can be included in the intermediate piece 1, when more than two components should be separately guided to the dispensing element 13. The check valve 4 is arranged in the first passage 2 and closes the first passage 2 when no dispensing pressure is exerted at the head 7 and only the opening pressure is present. The check valve 4 opens when a dispensing pressure is exerted, wherein the dispensing pressure has to be larger for this purpose than the opening pressure.

Figure 5:
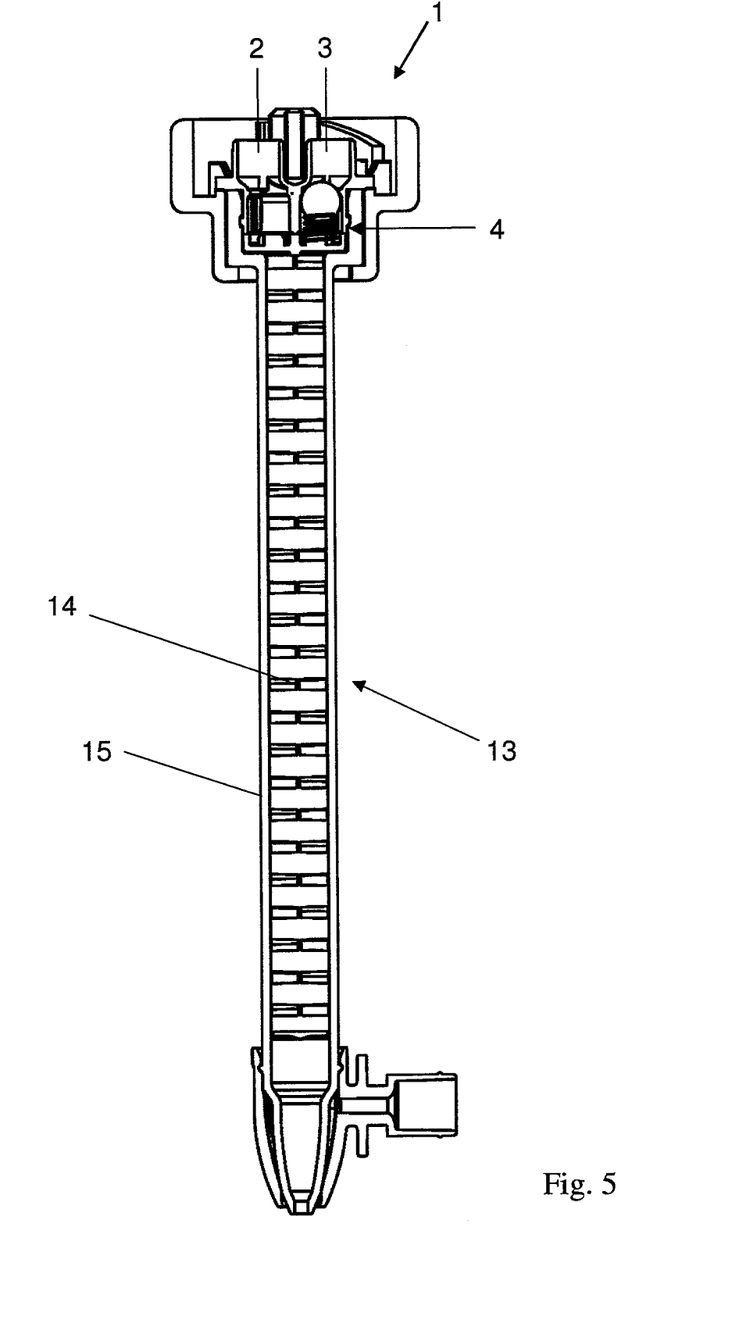
FIG. 5 is a section through a dispensing element having an intermediate piece in accordance with a variant of the second embodiment of the invention.

FIG. 5 shows a section through a dispensing element 13 having an intermediate piece 1 in accordance with a variant of the second embodiment of the invention and substantially corresponds to FIG. 3. The dispensing element 13 and the intermediate piece 1 in this connection are configured and manufactured as a one-part unit.

Figure 6:
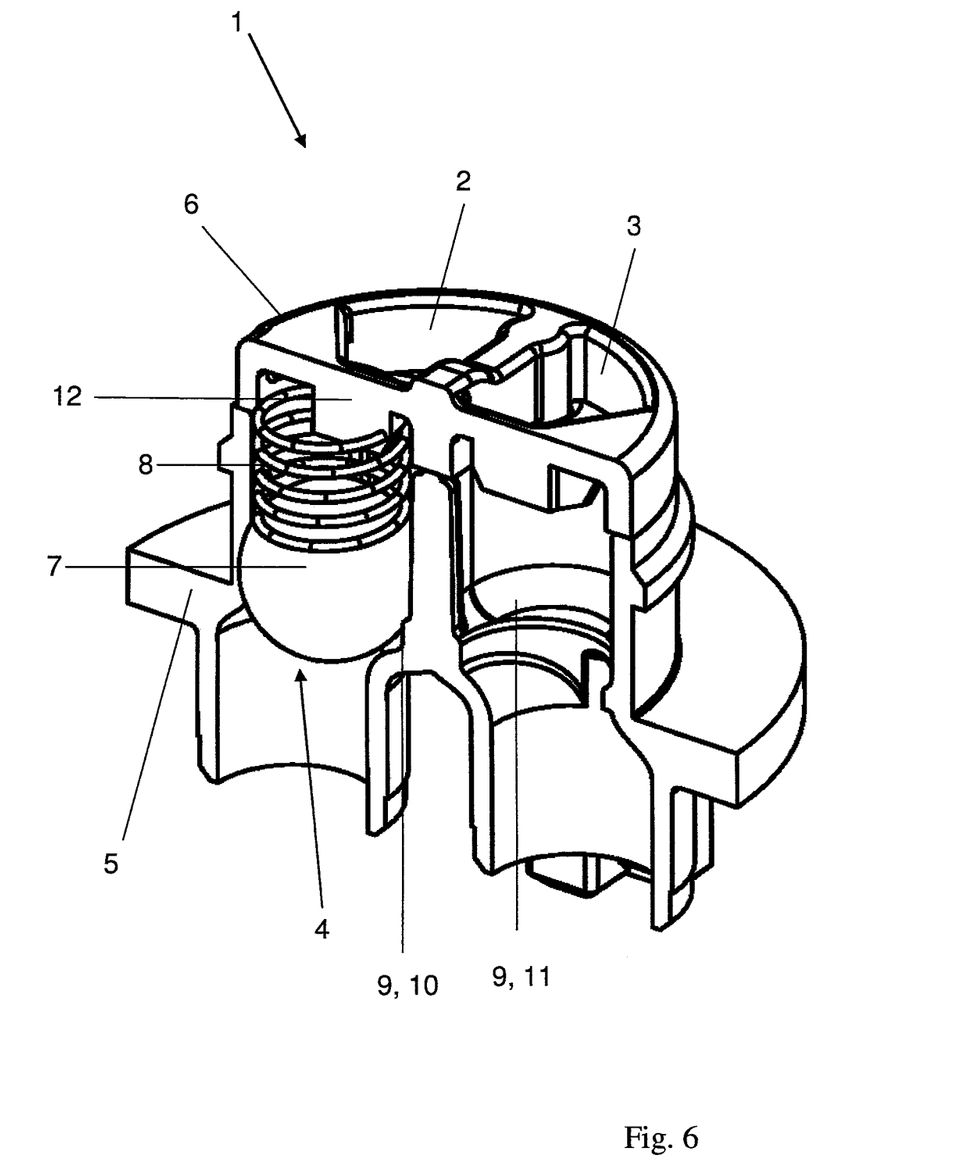
FIG. 6 is a three dimensional detailed illustration of an intermediate piece 1 in accordance with the first embodiment of the invention.

FIG. 6 shows a three dimensional detailed illustration of an intermediate piece 1 in accordance with the first embodiment of the invention. The shown assembly substantially corresponds to FIG. 1. The intermediate piece 1 is of two-part design and includes an upper element 5 and a lower element 6. The intermediate piece 1 includes a first passage 2 for conveying a first component from a storage container (not illustrated) to a dispensing element (not illustrated) and a second passage 3 for conveying a second component from the storage container (not illustrated) to the dispensing element (not illustrated). The first passage 2 and the second pas-sage 3 in this connection lead through the upper and the lower elements 5, 6. Moreover the first passage 2 and the second passage 3 are configured separate from one another such that the first component and the second component can be guided separately by the intermediate piece 1. A check valve 4 is arranged be-tween the upper and the lower element 5, 6 at the first passage 2. A surrounding edge 9 is configured in the lower element 6 in the first passage 2 as a valve seat 10 and a second valve seat 11.

The invention claimed is:

1. An intermediate piece for connection of a dispensing element to a storage container for a separate storage of at least two flowable components, comprising:
 a first passage configured to convey a first component from the storage container to the dispensing element;
 a second passage configured to convey a second component from the storage container to the dispensing element, the first passage and the second passage being separate from one another such that the first component and the second component are to be guided separately by the intermediate piece;
 a lower element; and
 a check valve comprising a head and a spring element exerting an opening pressure on the head, being arranged between the upper element and the lower element at the first or the second passage, and being configured such that the first passage or the second passage is capable of being closed by the check valve and such that the first passage or the second passage is opened when a dispensing pressure counteracting the opening pressure is applied at least at the respective first or second flowable component.

2. The intermediate piece in accordance with claim 1, wherein
 the upper element or the lower element comprise a connection element and the upper element and the lower element are connected to one another by the connection element.

3. The intermediate piece in accordance with claim 1, wherein
 the head of the check valve is a sphere.

4. The intermediate piece in accordance with claim 1, wherein
 a surrounding edge is formed as a first valve seat or a second valve seat in the first passage or the second passage such that the head contacts the first valve seat or the second valve seat and closes the first passage or the second passage.

5. The intermediate piece in accordance with claim 1, wherein
 the upper element has a fixing element and the spring element is arranged at the fixing element.

6. The intermediate piece in accordance with claim 5, wherein
 the spring element is configured to be adjusted by the fixing element.

7. A dispensing apparatus comprising:
 the intermediate piece according to claim 1.

8. The intermediate piece in accordance with claim 1, wherein
 the spring element is disposed in a passageway defined by the lower element.

9. A dispensing element comprising:
 an intermediate piece configured to connect a dispensing element to a storage container for separate storage of at least two flowable components, the intermediate piece having a first passage configured to convey a first component from the storage container to the dispensing element and having a second passage configured to convey a second component from the storage container to the dispensing element, the first passage and the second passage being configured to separate from one another such that the first component and the second component are capable of being guided separately by the intermediate piece,
 the intermediate piece comprising an upper element and a lower element, and
 a check valve comprising a head and a spring element exerting an opening pressure on the head being arranged between the upper element and the lower element at the first or the second passage and being configured such that the first passage or the second passage is capable of being closed by the check valve and such that check valve is opened when a dispensing pressure counteracting the opening pressure is applied at least at the respective first or second flowable component.

10. The dispensing element in accordance with claim 9, wherein
the dispensing element has a housing which includes at least one mixing element, and the housing has an inlet region, with the intermediate piece being arranged in the inlet region.

11. A dispensing apparatus comprising:
the dispensing element according to claim 9.

12. A storage container for a separate storage of a plurality of components, comprising:
an intermediate piece configured to connect a dispensing element to the storage container for separate storage of at least two flowable components, the intermediate piece having a first passage configured to convey a first component from the storage container to the dispensing element and having a second passage configured to convey a second component from the storage container to the dispensing element, the first passage and the second passage being separate from one another such that the first component and the second component are capable of being guided separately by the intermediate piece,
the intermediate piece comprising an upper element and a lower element, and
a check valve comprising a head and a spring element exerting an opening pressure on the head is arranged between the upper element and the lower element at the first or the second passage and being configured such that the first passage or the second passage is capable of being closed by the check valve and such that check valve is opened when a dispensing pressure counteracting the opening pressure is applied at least at the respective first or second flowable component.

13. The storage container in accordance with claim 12, further comprising
an outlet region and the intermediate piece is arranged in the outlet region.

14. A dispensing apparatus comprising:
the storage container according to claim 12.

* * * * *